…

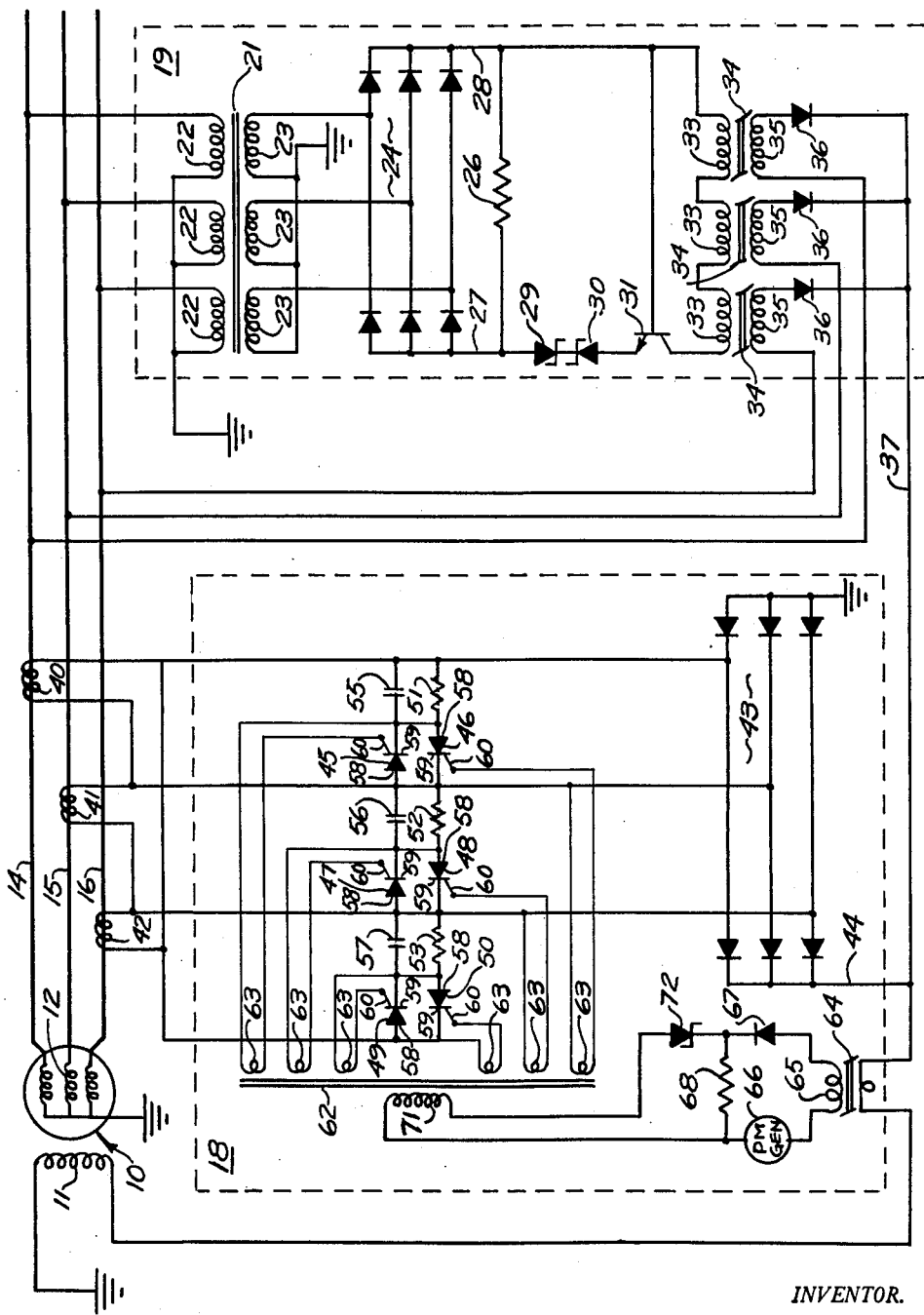

United States Patent Office 3,032,699
Patented May 1, 1962

3,032,699
EXCITATION LIMITING DEVICE FOR STATIC EXCITER-REGULATOR SYSTEMS
Hermann A. Kahle, Solon, Ohio, assignor, by mesne assignments, to The Siegler Corporation, Los Angeles, Calif., a corporation of Delaware
Filed June 12, 1959, Ser. No. 819,848
11 Claims. (Cl. 322—19)

This invention relates to an excitation system for alternating current generators and more particularly to an excitation limiting circuit for alternating current generators embodying static exciter regulator systems.

Systems for exciting alternating current generators by means of current transformers and rectifiers to furnish the one portion of the excitation and a voltage section for furnishing another portion of the excitation and regulating the excitation current to maintain the output voltage of the generator at the desired value have been proposed. In such systems, however, in the event of a high impedance fault or under excessive load on the generator, the currents flowing in the output conductors of the generator become great and the excitation furnished by the current transformers and rectifiers becomes excessive. Under such circumstances, the excitation of the generator may be much greater than should be supplied. The torque required by a generator from its driving mechanism varies approximately with the square of the generator field excitation current. Therefore, as a result of the high excitation current the torque demanded by the generator from its drive member may be several times the torque required for full rated loading. Calculations have shown that in some instances the maximum torque might become as great as twelve times the torque for rated load. Such high torques imposed on the generator shaft can cause serious damage to the generator driving mechanism. This is particularly true in the case of aircraft installations where a constant speed hydraulic drive mechanism is employed between the aircraft engine and the generator. Excessive torques can destroy the hydraulic drive mechanism and create serious hazards to the aircraft.

The general object of the present invention is therefore to provide a simple and effective circuit for limiting the excitation current supplied to the field of the generator and thus limiting the torque demanded by the generator. Other objects include the provision of such as excitation system that is composed of reliable and lightweight static components; the provision of an excitation system in which the response to over-excitation is extremely rapid so that there will be no substantial excessive loads applied to the generator shaft.

Other objects and advantages of the invention will become apparent from the following description of a preferred form thereof, reference being made to the accompanying drawing. The essential characteristics of the invention are summarized in the appended claims.

The single FIGURE of the drawing is a wiring diagram of a preferred form of static excitation system embodying my invention.

As shown in the drawing, the generator indicated in general at 10 has a field winding 11 and an armature or output winding 12 which is connected to the output conductors or buses 14, 15 and 16. In ordinary practice the field winding 11 is on the rotor of the machine while the armature or output windings are stationary. In order to provide excitation to the D.C. field 11 I preferably employ a static exciter system made up of a current section indicated in general at 18 and a voltage section indicated in general at 19. In accordance with usual practice the major portion of the excitation current is supplied by the current section 18 while a minor portion sufficient to supply excitation to the generator field under no load conditions and sufficient to provide regulation of the generator field is supplied by the voltage section 19.

The voltage section 19 may take the form of any convenient well-known type of voltage regulator circuit and per se forms no part of the present invention. A simple and effective voltage regulator section is shown in the drawing. This comprises a three-phase transformer 21 having its primary windings 22 connected in conventional manner to the output conductors 14, 15 and 16 and having secondary windings 23 that are connected to a full wave rectifier 24. A load resistor 26 is connected across the output conductors 27 and 28 of the rectifier. The voltage appearing across the load resistor 26 is applied to a pair of Zener diodes 29 and 30 which supply a voltage to the emitter of transistor 31 when the voltage across the load resistor 26 exceeds a predetermined value. Thus, the signal supplied to the emitter of transistor 31 depends upon the output voltage of the generator. When the transistor becomes conductive, current is caused to flow through the control windings 33 of the magnetic amplifiers 34. The output windings 35 of the magnetic amplifiers 34 are connected, respectively, to the output conductors 14, 15 and 16 of the generator and through rectifiers 36 to conductor 37 which leads to the positive side of the field windings 11 of the main generator. With this type of regulator, which is of known construction, an increase in the output voltage of the generator above the voltage that is predetermined by the circuit components and the Zener diodes 29 and 30 results in a decrease in the resistance to the flow of current from the conductor 28 through the transistor 31 to the conductor 27 and a corresponding decrease in the flow of current through the control windings 33. This results in a decrease in the output of the magnetic amplifiers 34 and a decrease in the excitation current supplied by the output windings 35 and the rectifiers 36 to the conductor 37. Conversely, a decrease in the output voltage of the generator results in an increase in the excitation current supplied by the voltage section 19. As stated above, this is a known mode of operation and any known type of voltage regulator having these general characteristics could be substituted for the voltage regulator disclosed herein.

The current section 18 of the excitation system comprises a current transformer associated with each of the output conductors 14, 15 and 16, the transformers having secondaries 40, 41 and 42, respectively. The outputs of the current transformers are connected in a conventional manner to a full wave rectifier 43 and the output of the rectifier is connected by means of conductor 44 to the conductor 37 leading to the field winding of the generator. With this construction and nothing more, the current transformers would supply excitation to the generator in proportion to the flow of current in the output conductors. As explained above, under some conditions, very heavy currents may flow in the output conductors and with the current transformer rectifier system and nothing more, excessive excitation would be supplied to the generator, resulting in the imposition of extremely heavy torque loads on the generator shaft.

In order to overcome this difficulty, I connect shunt circuits comprising switching devices and resistors across the terminals of each of the secondary windings of the current transformers. With this arrangement, closing the circuits through the switching devices bleeds off or diverts a portion of the output of the current transformers from the excitation circuit and permits the currrent to be dissipated or absorbed by the resistors in series with the switching devices.

In a preferred form of the invention, the switching devices comprise pairs of controlled silicon rectifiers 45 and 46, 47 and 48, and 49 and 50 connected back-to-back across the secondaries 40, 41 and 42, respectively. Resistors 51, 52 and 53 are connected in series with the pairs of controlled rectifiers and small smoothing capacitors 55, 56 and 57 are connected in parallel with the resistors 51, 52 and 53.

The controlled silicon rectifiers are PNPN semi-conductors, each having an anode 58, a cathode 59 and a gate 60. The rectifiers are normally non-conductive. Avalanche breakdown of the center junction is achieved by applying a signal to the gate, a very brief current pulse of 10 milliamperes at 1½ volts gate-to-cathode being sufficient. The amplitude of the current pulses is not critical, so long as it is sufficient to fire the rectifiers. Breakdown occurs at speeds that are almost instantaneous; after breakdown the voltage across the rectifiers is very low. An extremely small amount of power applied at the gate makes it possible to control the switching action of the rectifiers at very high rates of speed. When a rectifier is fired by applying appropriate current to the gate, the rectifier becomes conductive and continues to conduct until the forward voltage is removed; in this respect the device acts much in the manner of a thyratron. It can be made conductive during any part of the positive half cycle of the anode-to-cathode voltage and will remain conductive throughout the remainder of the positive half cycle. Thus, by applying appropriate signal currents at the correct times to the gates 60 of the controlled rectifiers, the rectifiers can be fired to bleed off or divert substantially all or any required portion of the current supplied by the current transformer secondaries 40, 41 and 42 to the rectifiers 43.

It will be evident that by supplying signal pulses at the correct instants to the gates 60 of the several controlled rectifiers, substantially all or any part of each half cycle of the output of the current transformers can be caused to flow through the rectifiers and the resistors; this causes part of the output of the current transformers to flow to the resistors 51, 52 and 53 and reduces the excitation supplied by the current transformers and rectifier 43.

In order to control the firing of the controlled rectifiers and to cause them to fire when the excitation current becomes excessive or exceeds a predetermined value, I preferably employ a transformer 62 having a separate output winding or secondary 63 for each of the controlled rectifiers, the output windings 63 being connected across the gates and cathodes of the rectifiers so that when the primary of the transformer is energized, a firing pulse is applied to the gate of each of the rectifiers.

The pulse transformer 62 preferably comprises a core of magnetic material ordinarily in toroidal form and arranged so that the core is in a state of neutral magnetization as long as no current flows in either winding, output pulses being generated in the output windings 63 in response to changes in magnetization of the core.

In order to cause the core to generate pulses when the excitation current exceeds a predetermined value, a D.C. transformer 64, which is in the nature of a saturable reactor, is associated with the conductor 37. This transformer has a saturable core, preferably of square loop material, and the primary of the transformer constitutes a single turn or a very few turns of the conductor 37. The secondary 65 of the transformer is wound on the core and is energized by any suitable A.C. supply, shown in the present example as a permanent magnet generator 66 which may be mounted on the shaft of generator 10. The secondary circuit is completed by a rectifier 67 and a load resistor 68. As the current flowing in conductor 37, constituting the primary of transformer 64, increases, the impedance to the alternating current output of generator 66 gradually becomes less. So long as the current in the conductor 37 remains less than the predetermined value, the voltage appearing across the load resistor 68 remains low enough so that any flow of current through input or primary winding 71 of the transformer 62 is blocked by the Zener diode 72. However, if the current in conductor 37 exceeds the predetermined value, the impedance of the secondary 65 of the D.C. transformer is reduced to such an extent that the current flowing through the load resistor 68 increases enough to cause the voltage appearing across the load resistor 68 to increase to a value exceeding the breakdown voltage of the Zener diode 72. Thereupon the input winding 71 of the pulse transformer is energized by half wave pulses and with each energizing pulse, an output pulse is produced in the six output windings, thereby firing the controlled rectifiers 45–50, permitting current to flow through the resistors 51, 52 and 53 and reducing the excitation current supplied to the generators. As soon as the excitation current is reduced below the predetermined value, the Zener diode 72 again blocks, no pulses are supplied to the input winding 71, and the controlled rectifiers, which normally become non-conductive whenever the positive half cycle of anode-to-cathode current reaches zero, will not be fired again by the pulse transformer. Since the torque required by the generator is approximately proportional to the square of the excitation current, limiting the excitation current as described effectively limits the generator torque and prevents the imposition of undue torque loads on the generator driving mechanism.

From the foregoing description of a preferred form of my invention, it will be evident that I have provided an excitation system for an alternating current generator in which the torque required by the generator is prevented from reaching excessive values by limiting the excitation current supplied to the generator field. This is accomplished, in a static exciter system embodying current transformers, by means of reliable and lightweight static components and relatively simple circuit arrangements. Thus the invention provides an efficient, reliable and safe static excitation system that is particularly adapted to use in aircraft.

Those skilled in the art will appreciate that various changes and modifications can be made in the preferred form of the invention disclosed herein without departing from the spirit and scope of the invention.

I claim:

1. In an excitation system for an alternating current generator having a field winding and output conductors, the combination of a current transformer having a secondary inductively associated with one of said output conductors for providing an output proportional to the current flow through one of the output conductors of the generator, a rectifier connected to said secondary for rectifying the output of the current transformer, circuit means connecting said rectifier and said field winding for supplying excitation current to said field winding, and means for reducing the excitation current supplied by said current transformer and said rectifier comprising a switching device and an impedance connected in series across the terminals of the transformer secondary, and means responsive to excitation current in said field for closing said switching device when said excitation current exceeds a predetermined value.

2. In an excitation system for an alternating current generator having a field winding and output conductor, the combination of a current transformer having a secondary inductively associated with one of said output conductors for providing an output proportional to the current flow through one of the output conductors of the generator for supplying a portion of the excitation current for said generator, a rectifier connected to said secondary for rectifying the output of the current transformer, circuit means connecting said rectifier and said field winding, a voltage regulator for supplying the balance of said excitation current, and means for reducing the excitation current supplied by said current transformer and said rectifier comprising a switching device and an impedance connected in series across the terminals of the transformer secondary, and means responsive to excitation current in said field for closing said switching device when said excitation current exceeds a predetermined value.

3. In an excitation system for an alternating current generator having a field winding and output conductors, the combination of a current transformer having a secondary inductively associated with one of said output conductors for providing an output proportional to the current flow through one of the output conductors of the generator, a rectifier connected to said secondary for rectifying the output of the current transformer, circuit means connecting said rectifier and said field winding for supplying excitation current to said field winding, and means for reducing the excitation current supplied by said current transformer and said rectifier comprising a controlled rectifier and an impedance connected in series across the terminals of the transformer secondary, and means responsive to excitation current in said field for firing said controlled rectifier when said excitation current exceeds a predetermined value.

4. In an excitation system for an alternating current generator having a field winding and output conductors, the combination of a current transformer having a secondary inductively associated with one of said output conductors for providing an output proportional to the current flow through one of the output conductors of the generator, a rectifier connected to said secondary for rectifying the output of the current transformer, circuit means connecting said rectifier and said field winding for supplying excitation current to said field winding, and means for reducing the excitation current supplied by said current transformer and said rectifier comprising a controlled rectifier and a resistance connected in series across the terminals of the transformer secondary, and means responsive to excitation current in said field for firing said controlled rectifier when said excitation current exceeds a predetermined value, said firing means comprising a transformer having a saturable core, the primary of said transformer carrying a current proportional to the excitation current, the transformer secondary being connected to a source of alternating current and circuit means connected to the secondary for firing the controlled rectifier.

5. In an excitation system for a polyphase alternating current generator having a field winding and a plurality of output conductors, the combination of current transformers associated with each of the output conductors, each transformer having a secondary having an output proportional to the current flow through one of the output conductors of the generator, a rectifier connected to said secondaries for rectifying the output of the current transformers, circuit means connecting said rectifier and said field winding for supplying excitation current to said field winding, and means for reducing the excitation current supplied by said current transformers and said rectifier comprising a solid state electronic switching device and an impedance connected in series across the terminals of each transformer secondary, and means responsive to excitation current in said field for closing said switching devices when said excitation current exceeds a predetermined value.

6. In an excitation system for an alternating current generator having a field winding and output conductors, the combination of current transformers associated with each of the output conductors of the generator, each current transformer having a secondary having an output proportional to the current flowing in one of the output conductors, a rectifier connected to said secondaries for rectifying the output of the current transformers, circuit means connecting said rectifier and said field winding for supplying a portion of the excitation current to said field winding, a voltage regulator adapted to supply a portion of the excitation of said generator and connected to said field winding, and means for reducing the excitation current supplied by said current transformers and said rectifier comprising a shunt circuit connected across each of the secondary windings of the current transformers, each shunt circuit comprising a controlled rectifier in series with a resistance, and means for firing the controlled rectifiers when the excitation current supplied to said field winding exceeds a predetermined value comprising a pulse transformer having a secondary winding connected across the gate-cathode circuits of the rectifiers, an input winding, and means for energizing the input winding when the field current exceeds a predetermined value.

7. In an excitation system for an alternating current generator having a field winding and output conductors, the combination of current transformers associated with each of the output conductors of the generator, each current transformer having a secondary having an output proportional to the current flowing in one of the output conductors, a rectifier connected to said secondaries for rectifying the output of the current transformers, circuit means connecting said rectifier and said field winding for supplying a portion of the excitation current to said field winding, a voltage regulator adapted to supply a portion of the excitation of said generator and connected to said field winding, and means for reducing the excitation current supplied by said current transformers and said rectifier comprising a shunt circuit connected across each of the secondary windings of the current transformers, each shunt circuit comprising a pair of controlled rectifiers connected back to back and in series with a resistance, and means for firing the controlled rectifiers when the excitation current supplied to said field winding exceeds a predetermined value comprising a transformer having a secondary winding for each of the controlled rectifiers, the secondary windings being connected across the gate-cathode circuits of the rectifiers, an input winding, and means for energizing the input winding when the field current exceeds a predetermined value.

8. In an excitation system for an alternating current generator having a field winding and output conductors, the combination of current transformers associated with each of the output conductors of the generator, each current transformer having a secondary having an output proportional to the current flowing in one of the output conductors, a rectifier connected to said secondaries for rectifying the output of the current transformers, circuit means connecting said rectifier and said field winding for supplying excitation current to said field winding, and means for reducing the excitation current supplied by said current transformers and said rectifier comprising a shunt circuit connected across each of the secondary windings of the current transformers, each shunt circuit comprising a controlled rectifier in series with a resistance, and means for firing the controlled rectifiers when the excitation current supplied to said field winding exceeds a predetermined value comprising a transformer having a secondary winding connected across the gate-cathode circuits of the rectifiers, an input winding, and means for energizing the input winding when the field current exceeds a predetermined value.

9. In an excitation system for an alternating current generator having a field winding and output conductors, the combination of current transformers associated with each of the output conductors of the generators, each current transformer having a secondary having an output proportional to the current flowing in one of the output conductors, a rectifier connected to said secondaries for rectifying the output of the current transformers, circuit means connecting said rectifier and said field winding for supplying excitation current to said field winding, and means for reducing the excitation current supplied by said current transformers and said rectifier comprising a shunt circuit connected across each of the secondary windings of the current transformers, each shunt circuit comprising controlled rectifiers connected back-to-back and in series with an impedance, and means for firing the controlled rectifiers when the excitation current supplied to said field winding exceeds a predetermined value comprising a pulse transformer having a secondary winding connected across the gate-cathode circuits of the rectifiers, an input winding, and means for energizing the input winding when the field current exceeds a predetermined value comprising a transformer having a saturable core, means for supplying a current to the primary of the saturable core transformer proportional to the field current, means for supplying an alternating current to the secondary of the saturable core transformer, a load resistor connected across the secondary of the saturable core transformer and a rectifier connected in series with the load resistor, the input winding of the pulse transformer being connected across the load resistor, and a Zener diode in series with the input winding of the pulse transformer the Zener diode becoming conductive when the voltage across the load resistor exceeds a predetermined value and thereby supplying a firing pulse to the pulse transformer and firing the controlled rectifiers.

10. In an excitation system for an alternating current generator having a field winding and output conductors, the combination of current transformers associated with each of the output conductors of the generator, each current transformer having a secondary having an output proportional to the current flowing in one of the output conductors, a full wave rectifier connected to said secondaries for rectifying the output of the current transformers, circuit means connecting said rectifier and said field winding for supplying excitation current to said field winding, and means for reducing the excitation current supplied by said current transformers and said rectifier comprising a shunt circuit connected across each of the secondary windings of the current transformers, each shunt circuit comprising a pair of controlled rectifiers connected back-to-back and in series with a resistor, and means for firing the controlled rectifiers when the excitation current supplied to said field winding exceeds a predetermined value comprising a pulse transformer having a secondary winding for each of the controlled rectifiers, the secondary windings being connected across the gate-cathode circuits of the rectifiers, an input winding, and means for energizing the input winding when the field current exceeds a predetermined value comprising a transformer having a saturable core, means for supplying a current to the primary of the transformer proportional to the field excitation current, means for supplying an alternating current to the secondary of the saturable core transformer, a load resistor connected across the secondary of the saturable core transformer and a rectifier connected in series with the load resistor, the input winding of the pulse transformer being connected across the load resistor, and a Zener diode in series with the input winding of the pulse transformer, the Zener diode becoming conductive when the voltage across the load resistor exceeds a predetermined value and thereby supplying a firing pulse to the pulse transformer and firing the controlled rectifiers.

11. In an excitation system for an alternating current generator having a field winding and output conductors, the combination of current transformers associated with each of the output conductors of the generator, each current transformer having a secondary having an output proportional to the current flowing in one of the output conductors, a full wave rectifier connected to said secondaries for rectifying the output of the current transformers, circuit means connecting said rectifier and said field winding for supplying excitation current to said field winding, a voltage regulator adapted to supply a portion of the excitation of said generator and connected between said output conductors and said field winding, and means for reducing the excitation current supplied by said current transformers and said rectifier comprising a shunt circuit connected across each of the secondary windings of the current transformers, each shunt circuit comprising a pair of controlled rectifiers connected back-to-back and in series with a resistor and a smoothing condensor in parallel with the resistor, and means for firing the controlled rectifiers when the excitation current supplied to said field winding exceeds a predetermined value, comprising a pulse transformer having a secondary winding for each of the controlled rectifiers, the secondary windings being connected across the gate-cathode circuits of the rectifiers, an input winding, and means for energizing the input winding when the field current exceeds a predetermined value comprising a transformer having a saturable core, means for supplying a current to the primary of the transformer proportional to the field excitation current, means for supplying an alternating current to the secondary of the saturable core transformer, a load resistor connected across the secondary of the saturable core transformer and a rectifier connected in series with the load resistor, the input winding of the pulse transformer being connected across the load resistor, and a Zener diode in series with the input winding of the pulse transformer, the Zener diode becoming conductive when the voltage across the load resistor exceeds a predetermined value, thereby supplying a firing pulse to the pulse transformer and firing the controlled rectifiers.

References Cited in the file of this patent
UNITED STATES PATENTS

| | | |
|---|---|---|
| 1,872,681 | Crago | Aug. 23, 1932 |
| 2,719,259 | Miner | Sept. 27, 1955 |

UNITED STATES PATENT OFFICE
CERTIFICATE OF CORRECTION

Patent No. 3,032,699  
May 1, 1962

Hermann A. Kahle

It is hereby certified that error appears in the above numbered patent requiring correction and that the said Letters Patent should read as corrected below.

Column 1, line 47, for "as" read -- an --; column 2, line 5, before "well-known" insert -- or --; column 4, line 59, for "conductor" read -- conductors --.

Signed and sealed this 28th day of August 1962.

(SEAL)  
Attest:

ESTON G. JOHNSON  
Attesting Officer

DAVID L. LADD  
Commissioner of Patents